United States Patent [19]

Boothroyd et al.

[11] Patent Number: 4,575,795

[45] Date of Patent: Mar. 11, 1986

[54] APPARATUS FOR DETECTING A PREDETERMINED CHARACTER OF A DATA STRING

[75] Inventors: Donald C. Boothroyd, Phoenix; Robert W. Norman, Jr., Glendale, both of Ariz.

[73] Assignee: Honeywell Information Systems Inc., Phoenix, Ariz.

[21] Appl. No.: 481,226

[22] Filed: Apr. 1, 1983

[51] Int. Cl.$^4$ ............................................... G06F 7/48
[52] U.S. Cl. ..................................................... 364/200
[58] Field of Search ... 364/200 MS File, 900 MS File, 364/769

[56] References Cited

U.S. PATENT DOCUMENTS

| | | | |
|---|---|---|---|
| 4,094,001 | 6/1978 | Miller | 364/900 |
| 4,247,891 | 1/1981 | Flynn et al. | 364/200 |
| 4,288,850 | 9/1981 | Kindell et al. | 364/200 |
| 4,450,520 | 5/1984 | Hollaar et al. | 364/200 |

Primary Examiner—Thomas M. Heckler
Attorney, Agent, or Firm—A. A. Sapelli; J. S. Solakian; A. Medved

[57] ABSTRACT

The present invention relates to digital logic circuitry for detecting a predetermined character of a data string for operand data stored in a temporary storage memory or while the data is being loaded into the temporary storage memory, wherein the data string length and the starting location of temporary storage memory in which the data string is to be stored is variable. A first comparator element compares a write address pointer to a start address pointer and an adder generates a sign pointer which indicates an address of temporary storage memory of the predetermined character. A second comparator element utilizes the pointers and the resultant outputs of the first comparator and the adder to indicate the end of the data string.

5 Claims, 11 Drawing Figures

APPARATUS FOR DETECTING A PREDETERMINED CHARACTER OF A DATA STRING

RELATED PATENT APPLICATIONS

The present patent application is related to the following U.S. patent applications and U.S. Patent, which are assigned to Honeywell Information Systems Inc., the assignee of the present application, all of the references listed below being incorporated by reference herein, to the extent necessary for an understanding of the present invention.

1. Apparatus for Aligning and Packing a First Operand Into a Second Operand of a Different Character Size, by Donald C. Boothroyd et al, Ser. No. 394,952, filed on July 2, 1982;
2. Data Alignment Circuit, by Donald C. Boothroyd et al, Ser. No. 394,951 filed on July 2, 1982;
3. Collector, by R. Guenthner, G. Edington, L. Trubisky, and J. Circello, Ser. No. 434,129, filed Oct. 13, 1982;
4. A Pipelined Decimal Character Execution Unit, by Donald C. Boothroyd et al, Ser. No. 481,224, filed on even date herewith;
5. U.S. Pat. No. 4,268,909, entitled "Numeric Data Fetch-Alignment of Data Including Scale Factor Difference", by Kindell et al.
6. Method for Decreasing Execution Time of Numeric Instructions, by Donald C. Boothroyd et al, Ser. No. 481,202, filed on even date herewith;
7. Apparatus for Forward or Reverse Reading of Multiple Variable Length Operands, by Donald C. Boothroyd et al, Ser. No. 481,225, filed on even date herewith;
8. Data Available Indicator for an Exhausted Operand String, by Donald C. Boothroyd et al, Ser. No. 481,227, filed on even date herewith;
9. Wraparound Buffer for Repetitive Decimal Numeric Operations, by Donald C. Boothroyd et al, Ser. No. 481,228, filed on even date herewith.

BACKGROUND OF THE INVENTION

This invention relates to the operational control of a digital computer system, and more particularly, to the digital logic circuitry for detecting a predetermined character of a data string before operating on the data string, the predetermined character of the present invention being a trailing sign character of the data string.

An objective, which almost always faces designers furthering the advancement of digital computers, is to decrease the time required for executing each of the instructions executed by the digital computer, thereby decreasing the overall time required by the digital computer to perform a predefined task. Many schemes have been devised by digital computer designers in an attempt to meet this objective. In the execution of some instructions, prior knowledge of the sign of the operand data can be helpful in speeding up the execution time of the instruction. In some prior digital computer systems, stacks (storage devices) are utilized to hold or temporarily store the operand data required by an execution unit of the digital computer system. Stacks of these prior digital computer systems which are utilized to temporarily store a single operand, have a predetermined starting point and access to the sign character can be had with relative ease prior to executing the instruction. However, obtaining the sign of the operand data in a digital computer system, in which the data can be of variable length and loaded into a stack beginning at a variable starting addresses, presents a problem to the designer trying to decrease the execution time. Further, for a digital computer system having a plurality of operand data formats, including a data format which has a trailing sign (i.e. the sign character is the lagging character rather than the leading character read from a main memory unit), obtaining the sign information of the operand data prior to executing the instruction can cause the overall execution time to increase rather than decrease, especially where the sign is in the least significant bit position and the operand data is read from storage most significant bit first.

The logic circuit of the present invention is implemented in a digital computer system having a plurality of operand data formats, including a data format having a trailing sign, and which further utilizes an operand data stack in which operand data of variable length is loaded at variable starting addresses. The logic circuit of the present invention detects the end of the data string for indicating the location of the sign character of the operand data as the operand data is being loaded into the stack. When the instruction is subsequently executed, the sign of the operand data is immediately available thereby aiding in decreasing the execution time of the instruction.

SUMMARY OF THE INVENTION

Therefore, there is provided by the present invention an apparatus for detecting a predetermined character of a data string being loaded into a temporary storage memory which comprises a first comparator for comparing a first pointer signal to a second pointer signal, to generate a first output signal when the value of the first pointer signal is less than the value of the second pointer signal. An adder is included for adding the second pointer signal to a first signal having a value corresponding to the number of locations of the temporary storage memory to be loaded, to generate a third pointer signal, and to generate a second output signal when the value of the second pointer signal is greater than the value of the third pointer signal. A second comparator is included for comparing a first input signal, wherein the firt input signal comprises the first output signal concatenated with the first pointer signal, to a second input signal, wherein the second input signal comprises the second output signal concatenated with the third pointer signal to generate a third output signal indicating the end of the data string when the first input signal is greater than the second input signal.

Accordingly, it is an object of the present invention to provide an apparatus for detecting a predetermined character of a data string prior to operating on the data string.

It is still another object of the present invention to provide an apparatus for detecting a predetermined character of a data string stored in a temporary storage memory or as the data string is being loaded into the temporary storage device.

It is still another object of the present invention to provide an apparatus for detecting a trailing sign character of a data string.

It is still another object of the present invention to provide an apparatus for detecting a trailing sign character of a data string prior to the execution of an instruction utilizing the data string.

These and other objects of the present invention will become more apparent when taken in conjunction with the following description and attached drawings, wherein like characters indicate like parts, and which drawings form a part of the present application.

DETAILED DESCRIPTION

Figure 1:
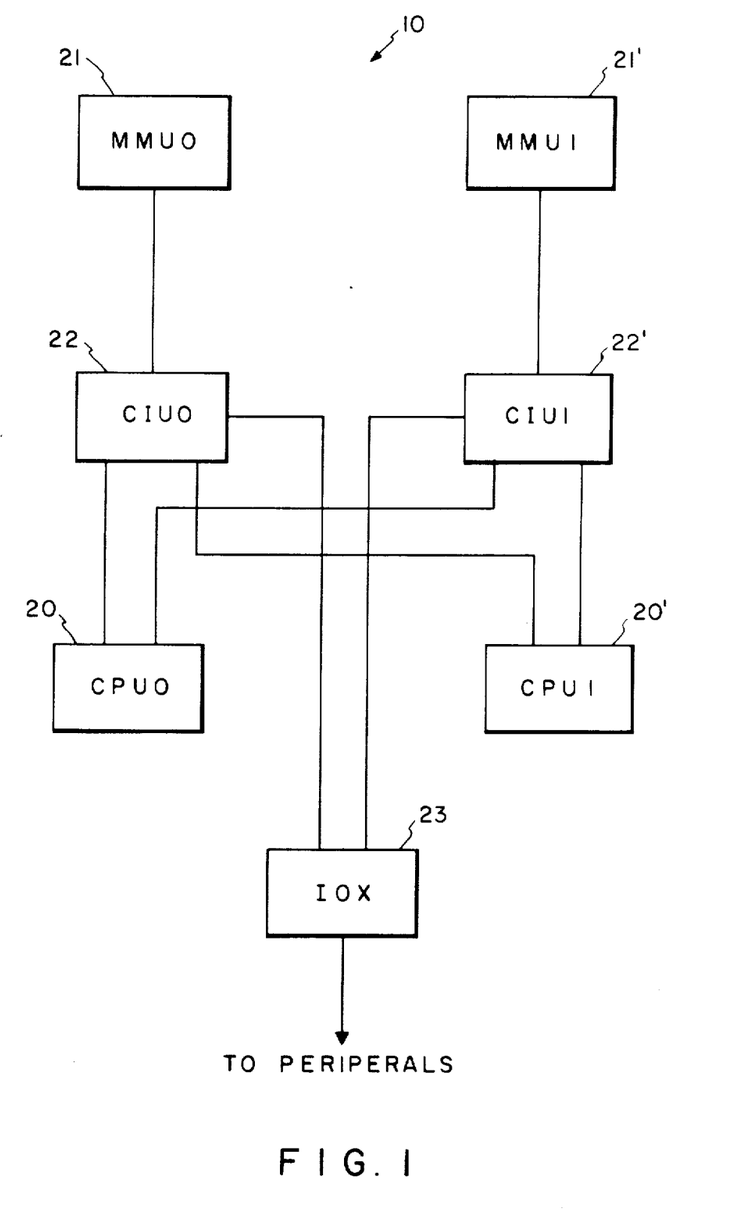
FIG. 1 shows a block diagram of a data processing system having a plurality of modules, including a central processing unit.

The present invention finds particular application in a decimal character execution unit for executing a predetermined class of instructions, namely decimal arithmetic and character operations. Before describing the present invention, it will be helpful to understand its operating environment, which will now be described. Referring to FIG. 1, a central processing unit (CPU) is shown as a module of a data processing system (DPS) 10. A first central processing unit (CPU 0) 20 and a second central processing unit (CPU 1) 20' comprise the CPU modules of DPS 10, each having full program execution capability and performing the actual information processing of the data processing system 10. CPU 0 20 and CPU 1 20' are each operatively connected to a first main memory unit (MMU0) 21 and a second main memory unit (MMU1) 21', through a first central interface unit (CIU 0) 22 and a second central interface unit (CIU 1) 22', respectively. MMU 0 and MMU 1 store programs and data utilized by CPU 0 and CPU 1. CIU 0 and CIU 1 act as the memory managers for the respective memories. CIU 0 and CIU 1 are each connected to an input/output multiplexer (IOX) 23 which provides an interface between the MMU and the various system peripherals. All CPU communication and interaction with other system modules is via the CIU. The DPS 10 of FIG. 1 shows a two CPU/two CIU configuration. It will be understood by those skilled in the art that various configurations are possible, including a single CIU/CPU configuration.

Figure 2:
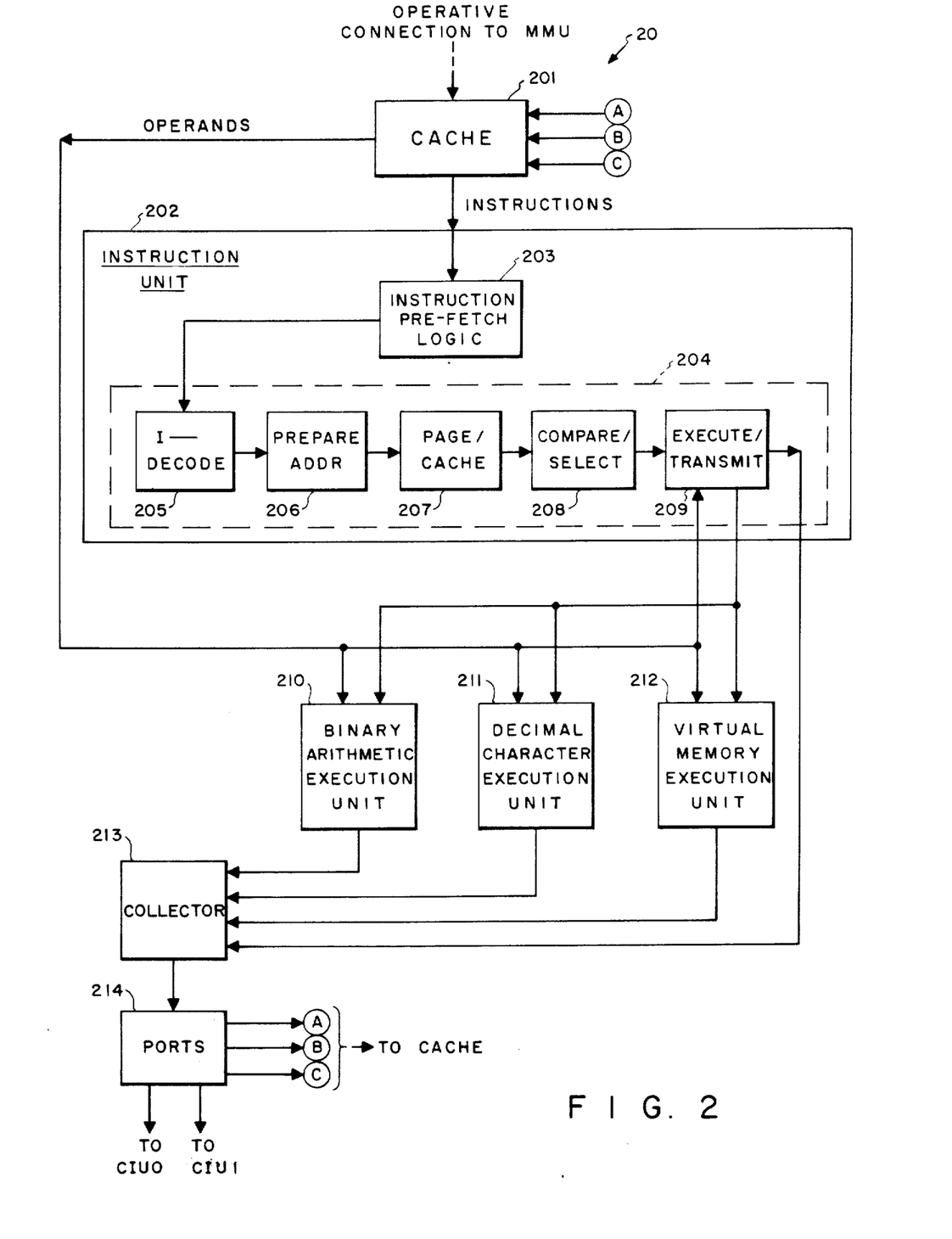
FIG. 2 shows a block diagram of the central processing unit in which a decimal character unit can be found.

Referring to FIG. 2, there is shown a block diagram of the preferred embodiment of the CPU 20 in which the present invention may be found. A cache memory (or more simply cache) 201 is provided for storing small blocks of words read from the main memory unit 21. The small blocks of words stored in cache 201 contain some instruction words and data words (or operand words) which will presently be executed and operated on by the execution units of CPU 20. An instruction unit 202 is included which comprises an instruction prefetch logic 203 and an instruction execution pipeline 204. The instruction prefetch logic 203 provides the instruction execution pipeline 204 with a supply of instructions to be executed. This is accomplished by including logic to predict the instruction sequence, prefetching instruction words from the cache memory 201, and storing them within the instruction prefetch logic block 203. The instruction execution pipeline 204 (also referred to herein as a central unit pipeline structure (CUPS)) performs the steps required for the execution of an instruction in individual stages. The first state (I-DECODE) 205 receives the instruction to be executed from the instruction prefetch logic 203 and decodes the instruction. The second stage (Prepare Address) 206 prepares the virtual address. The third stage (Page/Cache) 207 performs a paging operation of the operand address and cache directory lookup. The fourth state (Compare/Select) 208 initiates an operand access from cache 201 or from the main memory unit 21 in the case of a cache miss. The fifth stage (Execute/Transmit) 209 performs the actual execution of the instruction or dispatches information to an appropriate execution unit for execution.

In the preferred embodiment of the CPU, while all instructions must pass through all five stages of the central unit pipeline structure 204, not all instructions are fully executed in the fifth stage 209 of the pipeline. Some instructions are transmitted to other execution units outside the central unit pipeline structure 204, while the central unit pipeline structure 204 continues execution of succeeding instructions. The fifth stage 209 includes a basic operations execution unit (not shown) and central execution unit (not shown). The basic operations execution unit (not shown) performs the execution of those predetermined instructions which may be classified as basic operations. These are mostly very simple instructions requiring one or two cycles, including fixed point arithmetic (except multiply and divide), boolean operations, fixed point comparisons, register loads and shift operations. The central execution unit (not shown) executes a different set of predetermined instructions which refer to other instructions, move the contents of address registers or address related quantities between registers and storage, or alter processor stages.

Three additional instruction execution units are provided outside the central unit pipeline structure 204. A binary arithmetic execution unit 210 (BINAU) performs the execution of both binary and hexadecimal arithmetic operations and a fixed point multiply and divide. A decimal character execution unit (DECCU) 211 executes instructions involving decimal arithmetic, move and translate operations, character manipulations and binary string operations. The virtual memory execution unit (VMSM) 212 performs the execution of many privileged instructions including segment descriptor register manipulation, and handling fault and interrupt situations which manipulate the respective fault and interrupt registers. Each of the aforementioned execution units receives operands from the cache 201, and instructions (or commands) and descriptors from logic (not shown) of the fifth stage 209. Further, each execution unit usually operates independently of any activity occurring in the other execution units.

A collector execution unit, or more simply collector, 213 is the execution unit for most store instructions and is also the final execution unit involved in all other instructions. The collector 213 retrieves results from various results stacks of the other execution units, and updates cache 201 through a ports unit 214. The collector 213 also keeps a master copy of all program visible registers (not shown). The collector 213 permits the execution units to generate results independently and at different rates of speed, then updates the respective registers and cache in the original program sequence. The collector is more fully described in U.S. patent application Ser. No. 434,129 filed Oct. 13, 1982, entitled "Collector" by R. Guenthner, G. Edington, L. Trubisky, and J. Circello, assigned to the same assignee as the present application, the aforementioned application being incorproated by reference herein to the extent necessary for an understanding of the present invention. The ports unit 214 handles the CIU/CPU command interface processing, and the hierarchy control communication, i.e., the CIU/CPU memory hierarchy.

Although the preferred embodiment of the CPU 20 described above includes among its features paging, a 5-stage pipeline, instruction prefetch, virtual addressing, etc., it will be understood by those skilled in the art that the architecture of the DPS 10 or the CPU 20 described above is in no way intended to limit the decimal character execution unit 211 (or more simply decimal character unit) or to limit the present invention incorporated into the decimal character unit.

Figure 3:
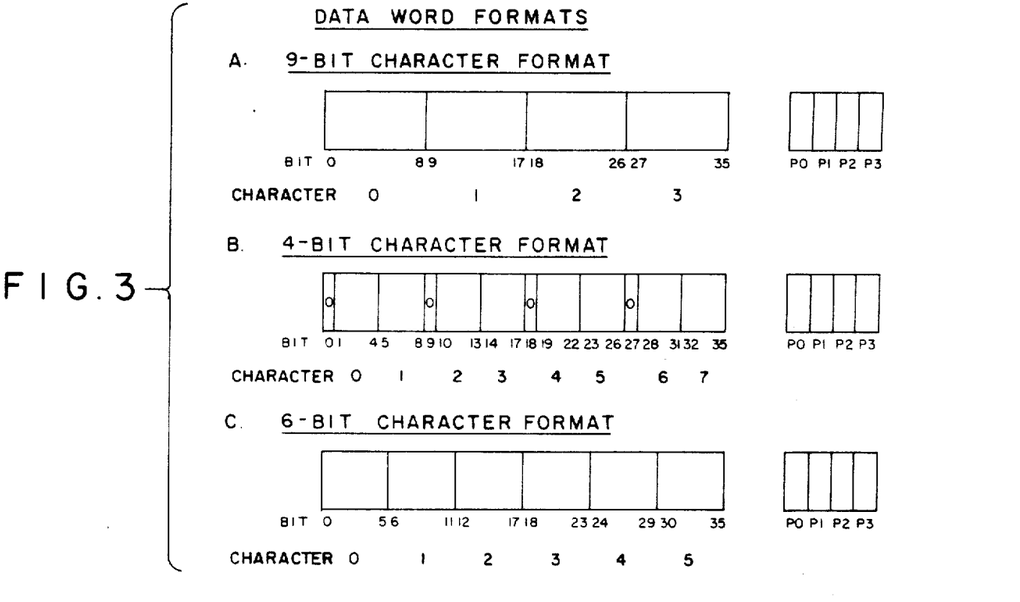
FIG. 3 shows a plurality of data word formats of the central processing unit.

Referring to FIG. 3, there is shown a 36-bit computer word of the preferred embodiment having a nine-bit character format, a four-bit character format, and a six-bit character format. The nine-bit character format (FIG. 3A) utilizes 9 bits to define a character, bits 0–8, 9–17, 18–26, and 27–35 defining characters 0, 1, 2 and 3, respectively. The four-bit character format (FIG. 3B) utilizes four bits to define a character, bits 1–4, 5–8, 10–13, 14–17, 19–22, 23–26, 28–31, and 32–35, defining characters 0, 1, 2, 3, 4, 5, 6 and 7, respectively. Characters 0 and 1 of the four-bit character format are defined by dividing character 0 of the nine-bit character format in half. The remaining bit assigned to the high order bit (i.e., the left most bit as shown in the figure), bit 0, is essentially a "don't care" or "irregular" bit. Likewise, characters 2 and 3, 4 and 5, and 6 and 7, of the four-bit character format is defined by dividing characters 1, 2, and 3 of the nine-bit character format, respectively, in half. The high order bit, or don't care bit, of the four-bit character format word, bits 0, 9, 18 and 27 can always be set to zero. The six-bit character format (FIG. 1C) utilizes 6 bits to define a character, bits 0–5, 6–11, 12–17, 18–23, 24–29, and 30–35 defining characters 0, 1, 2, 3, 4, and 5 respectively. Four additional bits in both the 9 and 4 bit character formats $P_0$, $P_1$, $P_2$, and $P_3$, can be carried along as the parity bits of respective characters. The "don't care" bit of the four-bit character bit is utilized, in the preferred embodiment, as a parity bit, and will be described in detail hereinunder. Since the six-bit character format does not contain a sign character, this character format is not utilized by the present invention.

Figure 4:
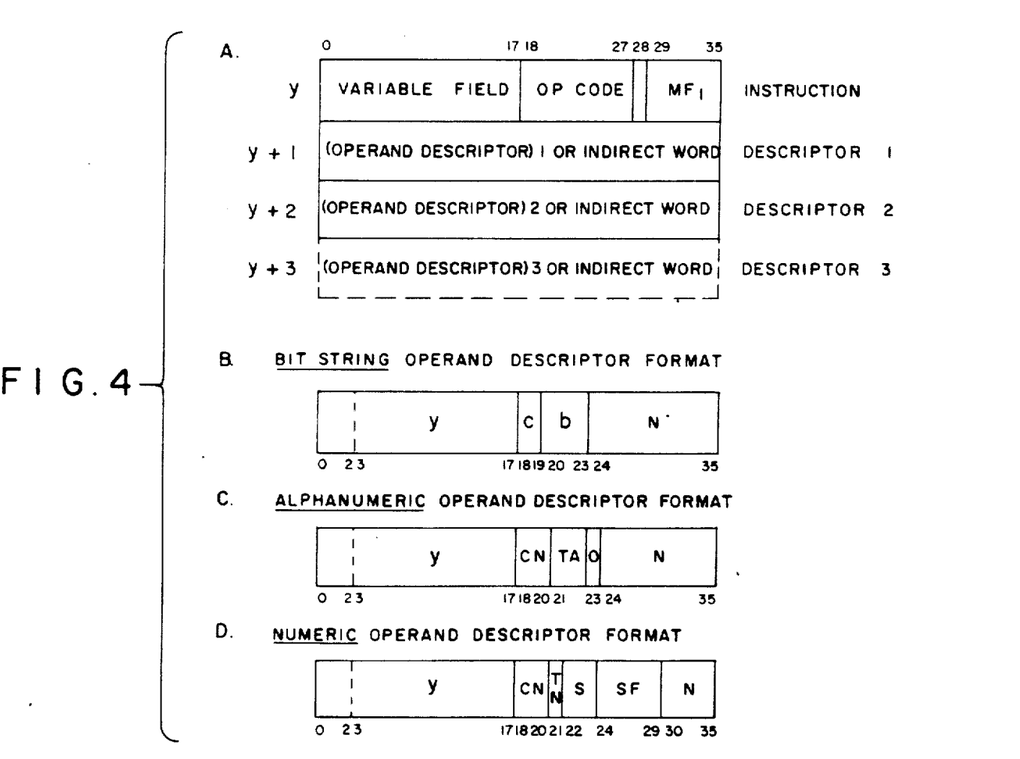
FIG. 4 shows the instruction word and descriptor word formats of the computer word of the central processing unit having a system configuration utilizing a plurality of execution units, including a decimal character unit.

FIG. 4A shows the computer instruction format of the preferred embodiment. The instruction word is the first word of the grouping and resides in the main memory unit 21 of the DPS 10 at a location Y. Up to three operand descriptor words, or simply descriptor words, reside in contiguous locations $Y+1$, $Y+2$, and $Y+3$, the number of descriptor words being determined by the particular instruction word. The instruction word contains the operation code, OP CODE, which defines the operation to be performed by the CPU. A second field $MF_1$ is the modification field which describes the address modification that is performed for descriptor 1. A third field, the Variable Field, contains additional information concerning the operation to be performed and will differ from instruction to instruction. When descriptors 2 and 3 are present, the Variable Field will contain information to describe the address modification to be performed on these operands. The descriptor words can be either the operand descriptor or an indirect word which points to the operand descriptor.

The operand descriptors which describe the data to be used in the operation, and provide the address for obtaining it from the main memory unit 21 are shown in FIGS. 4B, 4C, and 4D. A different operand descriptor format is required for each of the three data types, the three data types comprising the bit string, alphanumeric, and numeric types. The field denoted Y defines the original data word address, C defines the original character position within a word of nine bit characters, B defines the original bit position within a 9 bit character, and N defines either the number of characters or bits in the data string or a 4-bit code which specifies a register that contains the number of characters or bits. CN defines the original character number within the data word referenced by the data word address. TA defines the code that defines which type alpha-numeric characters are in the data, i.e., 9 bit, 6 bit, or 4 bit. TN defines a code which defines which type numeric characters are specified, i.e., 9 bit or 4 bit. S defines the sign and decimal type, that is leading sign-floating point, leading sign-scaled, trailing sign-scaled, or no sign-scaled. SF defines the scale factor, the scale factor being treated as a power of 10 exponent where a positive number moves the scaled decimal point to the right and a negative number moves the scaled decimal point to the left. The decimal point is assumed to be immediately to the right of the least significant digit.

Figure 5:
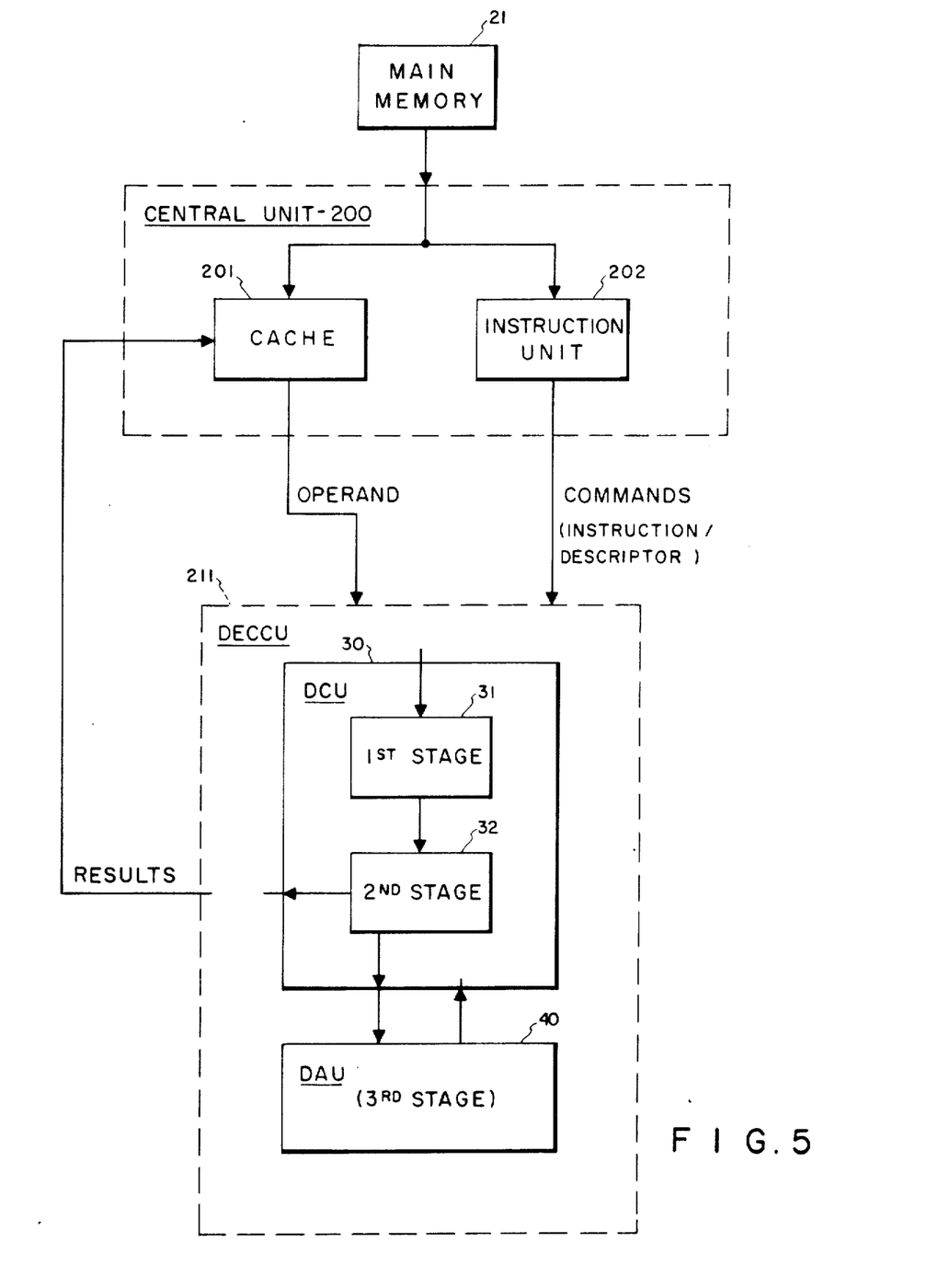
FIG. 5 shows a functional block diagram of the decimal character unit.

Referring to FIG. 5, there is shown the decimal character execution unit (DECCU) 211 in functional block diagram form. The DECCU 211 is the execution unit of the CPU 20 for a predetermined set of multiword instructions, including decimal arithmetic instructions, various character manipulation instructions, and instructions which operate on binary strings. The DECCU 211 is partitioned into two functional units, the character unit (DCU) 30 and the arithmetic unit (DAU) 40. The DCU 30 comprises two stages, a first stage 31, and a second stage 32. The DAU 40 comprises the third stage of the DECCU 211. The DECCU 211 receives operands from cache 201 and command information from instruction unit 202. The cache 201 and instruction unit 202 comprise the central unit 200 which is also operatively connected to main memory 21. Results from the DECCU 211 are transmitted to cache 201 (via the action of the collector 213 as discussed. The DCU 30 executes the character manipulation instructions including bit string instructions, and the DAU 40 executes the arithmetic instructions. The instructions executed by DECCU 211 are listed in Table 1. A complete description of each instruction is included in a Honeywell Software document entitled, "DPS 8 Assembly Instructions," copyright 1980 by Honeywell Information Systems Inc. (Order No. DH03-00), and can be referred to for more detailed information.

Figure 6:
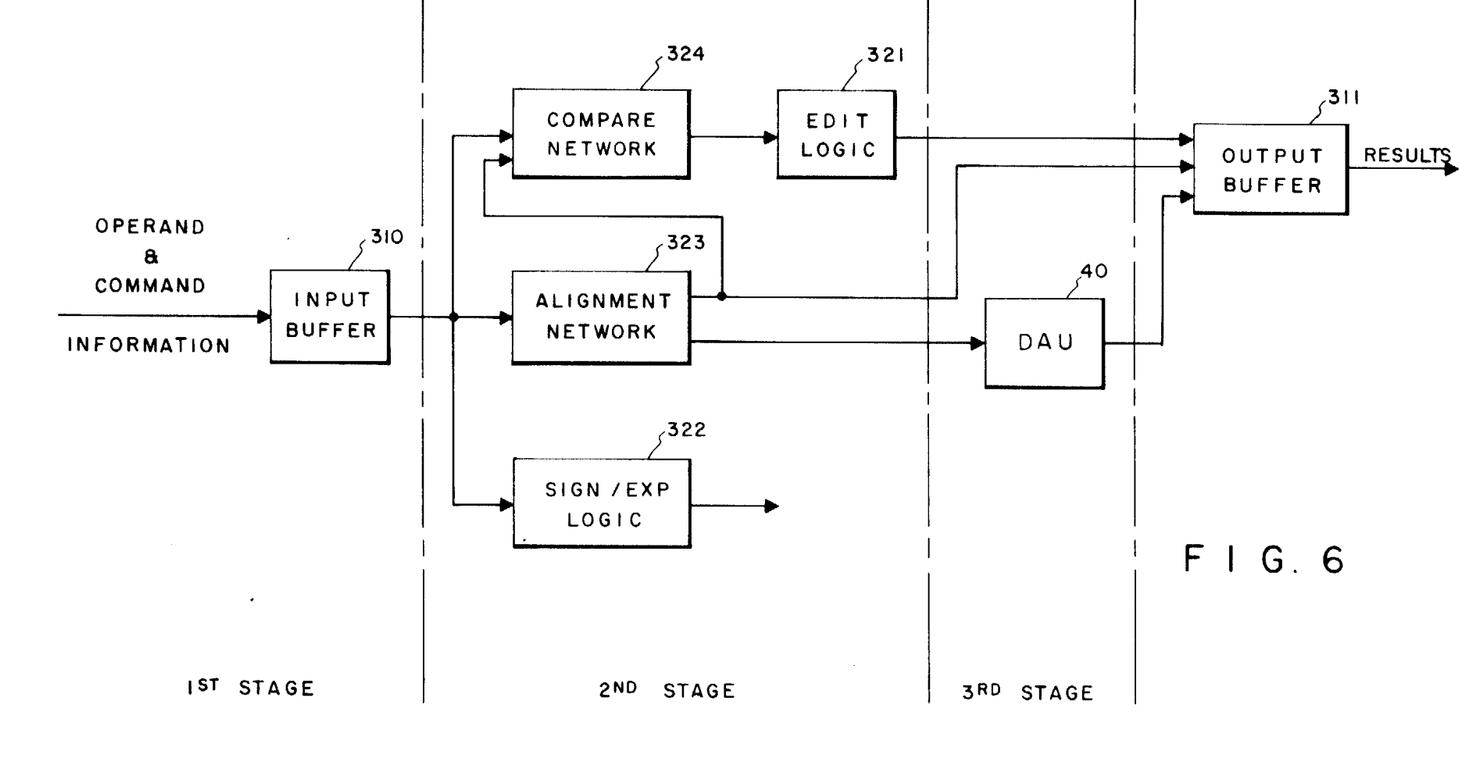
FIG. 6 shows a functional block diagram of the stages of the decimal character unit.

Referring to FIG. 6, a functional block diagram of the stages (or also referred to herein as levels) of the DECCU 211 is shown. The first stage 31 receives instruction and descriptor information from the instruction unit 202, and further receives the operand information from cache 201. The operands are stored in an input buffer 310 within the first stage 31, and the instructions are decoded and held in temporary registers and control flip flops of the first stage 31.

TABLE 1

| | ALPHANUMERIC |
|---|---|
| MLR | Move Alphanumeric LEFT to Right |
| MRL | Move Alphanumeric RIGHT to Left |
| MVT | Move Alphanumeric with Translation |
| CMPC | Compare Alphanumeric Character String |
| SCD | Scan Character Double |
| SCDR | Scan Character Double in Reverse |
| TCT | Test Character and Translate |
| TCTR | Test Character and Translate in Reverse |
| SCM | Scan with Mask |
| SCMR | Scan with Mask in Reverse |
| | EIS. NUMERIC |
| MVN | Move Numeric |
| CMPN | Compare Numeric |
| AD3D | Add Using Three Decimal Operands |
| AD2D | Add Using Two Decimal Operands |
| SB3D | Subtract Using Three Decimal Operands |
| SB2D | Subtract Using Two Decimal Operands |
| MP3D | Multiply Using Three Decimal Operands |
| MP2D | Multiply Using Two Decimal Operands |
| DV3D | Divide Using Three Decimal Operands |
| DV2D | Divide Using Two Decimal Operands |
| | EIS. BIT. STRING |
| CSL | Combine Bit Strings Left |
| CSR | Combine Bit Strings Right |
| SZTL | Set Zero and Truncation Indicator With Bit Strings Left |
| SZTR | Set Zero and Truncation Indicator With Bit Strings Right |
| CMPB | Compare Bit Strings |
| | EIS. CONVERSION |
| DTB | Decimal to Binary Convert |
| BTD | Binary to Decimal Convert |
| | EIS. EDIT. MOVE |
| MVE | Move Alphanumeric Edited |
| MVNE | Move Numeric Edited |
| | NEW. EIS. MULTIWORD |
| CMPCT | Compare Characters and Translate |
| MRF | Move to Register Format |
| MMF | Move to Memory Format |
| TEN. INSTRUCTIONS: EBCDIC/OVERPUNCHED SIGN CAPABILITY | |
| MVNX | |
| CMPNX | |
| AD3X | |
| AD2DX | |
| SB3DX | |
| SB2DX | |
| MP3DX | |
| MP2DX | |
| DV3DX | |
| DV2DX | |
| MVNEX | Move Numeric Edited Extended |

Second stage 32 contains edit logic 321, sign/exp logic 322, alignment network 323, and compare network 324 required to perform the character manipulation and alignment operations. The output of the second stage 32 is either the final result which is transmitted to an output buffer 311 to be stored in cache 201, or is aligned data passed to the DAU 40. The DAU 40, which comprises the third stage of the DECCU 211, performs the arithmetic operation on the aligned data (arithmetic operation may also be referred to herein as numeric execution). Each stage of the DECCU 211 will be described in detail hereinunder.

Figure 7:
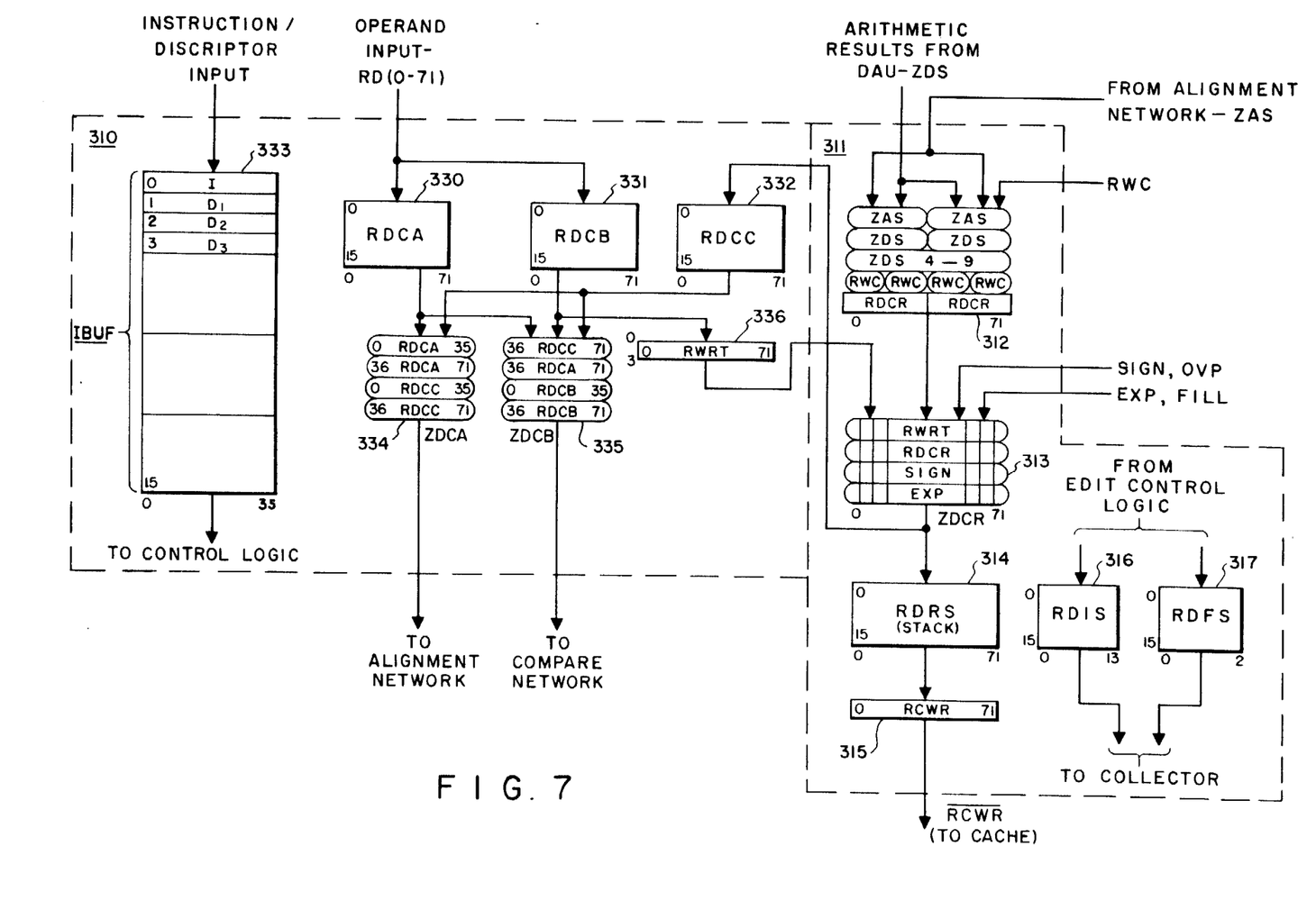
FIG. 7 shows a functional logic diagram of the input buffer and output buffer of the decimal character unit.

The input buffer 310 and output buffer 311 of the decimal character unit is shown in FIG. 7. The input buffer 310 comprises a first and second operand input stack, RDCA and RDCB 330 and 331, respectively (also referred to as stack A and stack B, respectively), a third stack RDCC 332 (also referred to as stack C), and an instruction/descriptor input buffer 333, IBUF. A first and second switch 334 and 335 (also denoted as the ZDCA and ZDCB switches, respectively) is included as part of input buffer 310. First switch 334 is operatively connected to stack A 330 and stack C 332 for transferring selected data, ZDCA, to alignment network 323. Second switch 335 is operatively connected to stack A 330, stack B 331, and stack C 332 for transferring selected data ZDCB to compare network 324. A rewrite register 336, RWRT, is operatively connected to stack B 331, the output of RWRT being connected to output buffer 311. The loading of IBUF 333, and the operand input stacks 330, 331 is from CUPS 204 and cache 201, respectively under the control of CUPS 204.

The IBUF 333 is a 16 word by 36 bit wraparound buffer. Upon receipt of an instruction available signal from CUPS 204, an instruction/descriptor word is read into the corresponding location of IBUF 333. IBUF is organized in 4 four-word blocks, thereby capable of storing up to a maximum of four instructions at a time. The first word of the block is for storing the instruction word I, the second word of the block is for the first descriptor word D1, the third word of the block is for the second descriptor word D2 and the fourth word of the block is for the third descriptor word, if any. The information contained in the instruction/descriptor words is transferred to the various control logic for the generation of control signals to effect the execution of the functions required to execute the instruction. An IBUF-full control signal is sent to CUPS 204 when IBUF 333 is full. The format of the instruction/descriptor words and the significant control signals are described in the related patent application, paragraph (4) identified above and incorporated by reference herein.

Operand input data (also denoted by signal name RD) is loaded into stack A 330 and stack B 331 as a function of the instruction. In the preferred embodiment, stack A 330 and stack B 331 are each 16 word×72-bit memory devices. Double word writes are made into the operand stacks 330, 331 and can hold operands awaiting execution for a maximum of 4 instructions. When the DECCU 211 receives a control signal from CUPS 204 indicating operands are available, the operands are fetched by doubleword reads. The input operands are loaded into stacks A and B 330, 331 according to steering control signals. An operand full control signal is transmitted to the CUPS 204 from the DECCU 211 when either operand stack is full. A stack full signal from stack A 330 and a stack full signal from stack B 331 is ORed to generate the operand full control signal to CUPS 204. Operand 1 data is loaded into stack A 330, and operand 2 data is loaded into stack B 331 for character type instructions. Operand 1 and operand 2 data are loaded into stack A 330 for numeric-type instructions (instructions sometimes being referred to as operations or OPS). Rewrite data and translated data are loaded into stack B 331. The loading of the operands into the operand stacks is selected according to the instructions as shown in Table 2.

TABLE 2

| DECCU Instruction | Stack A RDCA | Stack B RDCB |
|---|---|---|
| MLR,MRL | OP1 | OP2 |
| MRF,MMF | OP1 | — |
| MVT | OP1 | OP2,OP3 |
| MVE,MVNE | OP1 | OP2,OP3 |
| TCT,TCTR | OP1 | OP2 |
| SCM,SCD | OP1 | OP2 |
| CMPC | OP1 | OP2 |
| CMPCT | OP1 | OP2,OP3 |
| CSL,CMPB,SZTL | OP1 | OP2 |
| DTB | OP1,OP2 | — |
| BTD | OP1 | OP2 |
| MVN | OP1,OP2 | OP2 |
| AD2D,MP2D | OP1,OP2 | OP2 |
| AD3D,MP3D | OP1,OP2 | OP3 |
| CMPN | OP1,OP2 | — |
| LPL,SPL | OP1 | — |

Operand data can be read from stack A 330 a double word at a time if it is to be packed 9-bit to 4-bit. This can occur with unpacked numeric operands and the MLR and MRL instructions. Otherwise the operand data is read on a single word basis. Operands from stack B 331 are single word reads. Rewrite data from stack B 333 is loaded into the RWRT (the rewrite register) 336 by a double word read. It can be seen that either a double word can be selected from stack A 330 or two single words from stack A 330 and B 331 by the ZDCA and ZDCB switches 334, 335, but not both.

DECCU numeric results are stored in stack 332 as well as result stack RDRS (the result stack will be described in detail hereinunder in conjunction with the output buffer 311) in case the result is to be one of the input operands for a numeric instruction immediately following. The normal operand fetches for that operand are cancelled, and that operand is read instead from stack C 332 thereby eliminating the delay introduced by a store-load break. Wraparound data from stack C 332 can be read on either a double word or single word basis just as if the operand were in stack A 330. The selected operand data, ZDCA and ZDCB, are sent to the alignment network 323 for alignment, to the compare network 324 for character comparison and selection, and to the sign/exp logic 322 to extract signs and exponents.

The control logic (not shown) generates the read and write addresses for the stack A 330, stack B 331, and stack C 332. The control logic also generates the select controls for the ZDCA and ZDCB switches 334, 335. In addition, the control logic generates data available signals that allow the input registers of the alignment network 323 and the compare network 324 to be loaded. The control logic signals the CUPS 204 when ten or more locations in either stack A 330 or stack B 331 are used to prevent writing over good data.

The output buffer 311 comprises a 1-of-4 select double word register 312 (more simply referred to as the RDCR register), having inputs ZDS, arithmetic results from DAU 40, ZAS from alignment network 323, and resultant output from edit logic 321 (RWC register to be discussed hereinunder). An output buffer select switch 313 (or more simply referred to as ZDCR switch) receives inputs from RDCR register 312, RWRT register 336, the sign, OVP data from sign/exp logic 322, and the EXP, FILL data from compare network 324. The data selected by the ZDCR switch 313 is stored in a results stack RDRS 314. The results stack RDRS 314 is a 16 word by 72 bit memory device or stack. The results stack 314 stores data to be stored in cache 201 via a RCWR register 315. The output buffer 311 also includes an indicator results stack 316 and a fault results stack 317. Indicator results stack 316 is a 14 bit × 15 high stack, and fault results stack 317 is a 3 bit × 15 high stack. Inputs are received from edit control logic and output results are transferred to the collector 213.

Figure 8:
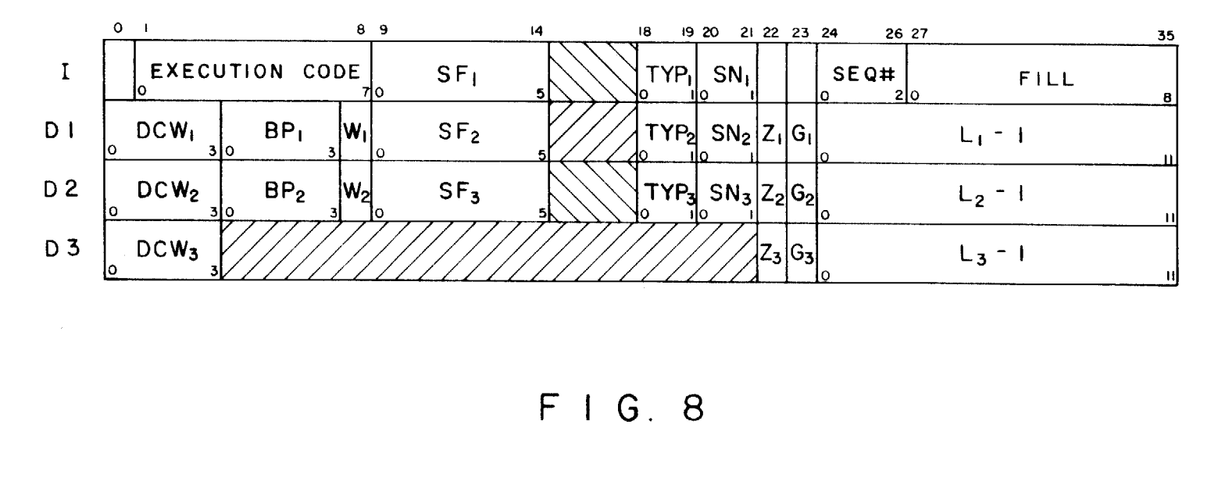
FIG. 8 shows a format of the decimal character unit instruction and descriptor words.

The format of the DECCU instruction/descriptor words is shown in FIG. 8. The words are generated by the CUPS 204 in the format shown. The instruction word includes the scale factor and sign information of the first operand. This format is important from timing considerations which will be described in detail hereinunder. SF, indicates scale factor for numeric operands. TYP identifies the data type as follows: 00 for 9-bit format, 01 for 6-bit data, and 10 for 4-bit data. SN indicates sign and decimal type for numerics. SEQ# indicates a sequence number and FILL is the fill character field. DCW indicates position within double word of first character, BP indicates position within first byte of first bit, and W indicates this operand is in stack C 332. Ln indicates the length of operand n, Zn is set if LN is zero, and Gn is set if Ln is greater than 256.

Figure 9:
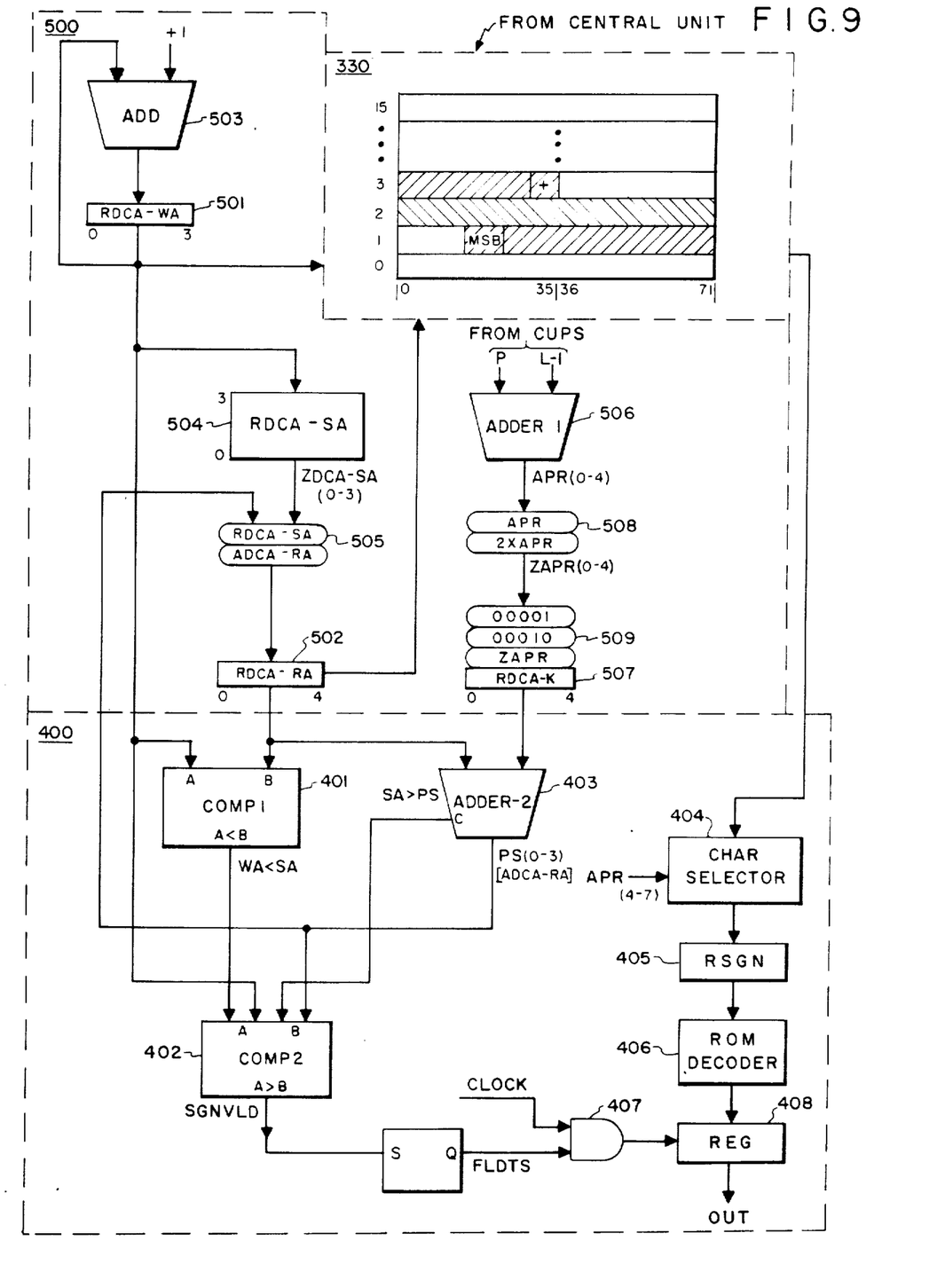
FIG. 9 shows a block diagram of the preferred embodiment of the present invention.

The control logic of the present invention will now be described. Referring to FIG. 9, there is included a block diagram of the preferred embodiment of the present invention. The first operand input stack 330 (stack A) stores operand data, stack A of the preferred embodiment being a 16,high × 72 bit stack. As mentioned above, the computer word of the preferred embodiment is a 36-bit word. Therefore, each addressable location of the stack A 330 is a double word. The stack A 330 is divided into an even and odd half, each half storing single computer words, bits 0-35 define the even half of the stack and bits 36-71 define the odd half of the stack. Control logic 500, which controls the reading and writing of operand data into stack A 330, includes a write address register (RDCA-WA) 501 and a read address register (RDCA-RA) 502, both registers being operatively connected to stack A 330. Operand data from the central unit 200 is stored into sequential locations indicated by a write address value stored in the write address register RDCA-WA 501, the write address value denoted herein as the write address pointer (WA or WA pointer), and the write address value being incremented by one by an adder ADD 503. The first write address value of a set of data is also a starting address value for that data set, and is stored in a starting address register (RDCA-SA) 504. The starting address register 504 of the preferred embodiment is a 4-high × 4-bit bank of registers. Since as many as four sets of operand data can be stored in stack A 330 (a data set being associated with an instruction), four starting address values (SA or SA pointer) can be stored in the starting address register 504 and four bits are required to address the 16 locations of stack A 330 (the numbers in the parenthesis of FIG. 9 indicate the bits, e.g., 0-3 references bits 0 through bits 3). The starting address register 504 is operatively connected to the read address register 502 through a start address switch 505.

Included as part of control logic 500 is ADDER1 506 which adds the length of the operand (L-1) and the position within the double word of the first character (P). These quantities are received from CUPS 204 as discussed above in conjunction with FIG. 8. The output of adder 1 506 indicates the number of double words minus one which are to be loaded and defined as signal APR (0-4). The APR signal is loaded into a constant register (RDCA-K) 507 via an APR switch 508 and a constant switch 509. The output of APR switch 508 is a ZAPR signal which is either the APR signal or two times the APR signal, the APR signal being utilized for four-bit data format words and two times the APR signal being used for the nine-bit data format words. The constant switch 509 is utilized in part for selecting single word reads or double word reads of stack A 330 as will be described in further detail hereinunder.

The preferred embodiment of the dynamic character detector 400 of the present invention includes a first comparator (COMP1 401 and an adder ADDER2 403, the dynamic character detector being able to detect a predetermined character in a predetermined position while the data is being loaded into storage and before execution. The predetermined character position of the preferred embodiment is the trailing position of a data string and the predetermined character being the sign character. The output of COMP1 401 and ADDER2 403 are operatively connected to a second comparator COMP2 402. First comparator COMP1 401 compares the starting address pointer to the write address pointer. When the write address pointer is less than the start address pointer an output signal is generated which is coupled to the high order position of the A input of COMP2 402. The low order positions of the A input of COMP2 402 are coupled to receive the write address pointer from the write address register 501. Thus, the A-input signal to COMP2 402 is made up of the output of COMP1 401 concatenated with the write address pointer. ADDER2 403 adds the contents of constant register 507 and the start address value from read address register 502 to generate a sign pointer (PS) quantity which is coupled to the low order positions of the B input of COMP2 402. The carry signal from ADDER2 indicates when the starting address pointer is greater than the sign pointer and is coupled to the high order position of the B input of COMP2 402. The output of ADDER2 403 is also coupled to start address switch 505 which is utilized during the read portion of stack A 330 (the output signal of ADDER2 403 is also denoted herein as ADCA-RA). When the A input value of COMP2 402 is greater than the B input value, output signal SGNVLD is generated indicating the end of the operand data string. The end of the data string initiates a read of the trailing word into a character selector 404. The trailing character is determined, transferred to a temporary holding register RSGN 405, and compared in a ROM decoder 406 to a predetermined character (or characters). If it is valid, the sign is outputted and stored in a register REG 408 for subsequent use.

Figure 10:
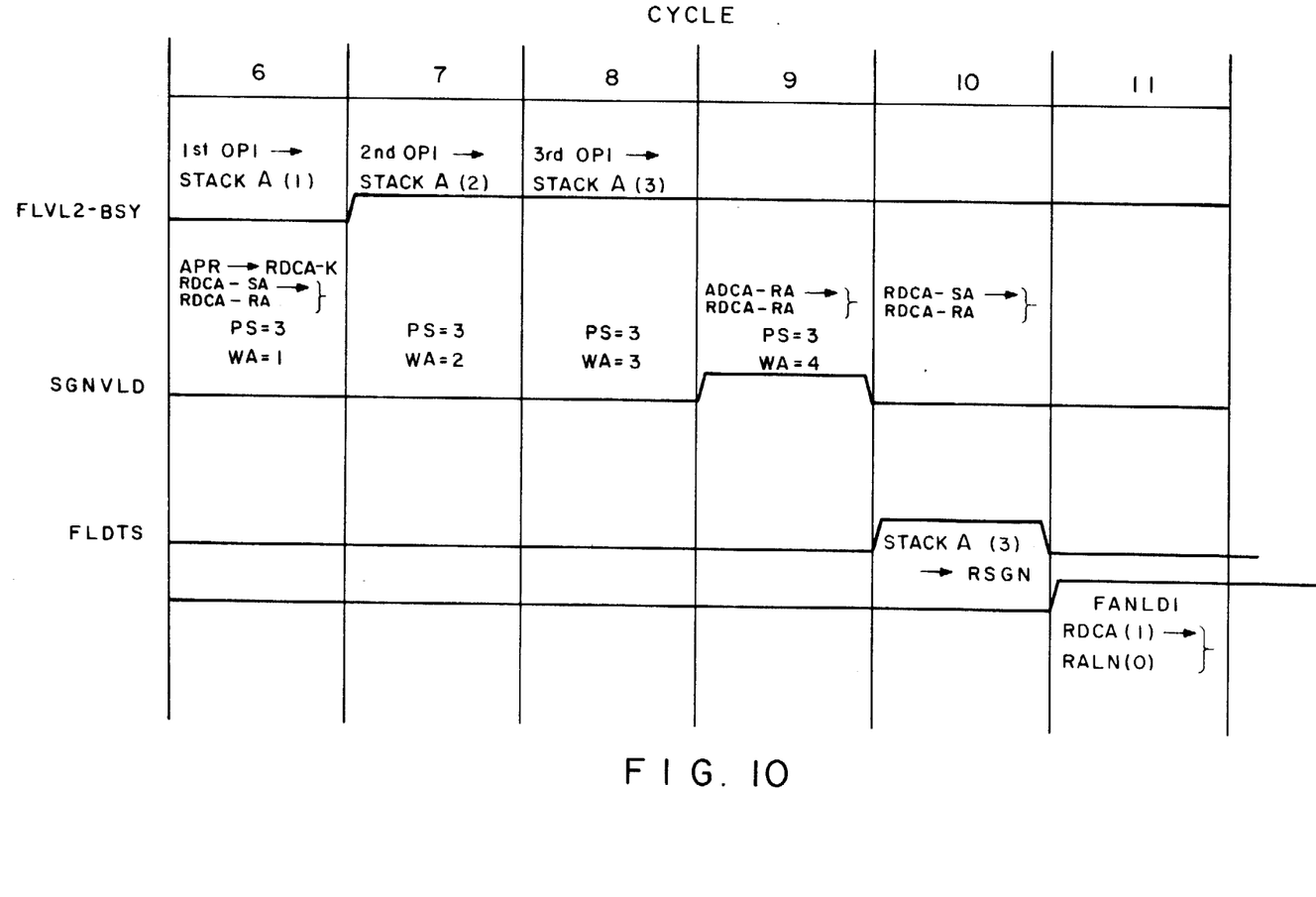
FIG. 10 shows a timing diagram of the steps performed by the preferred embodiment of the present invention.

The operation of the present invention will now be described in conjunction with FIGS. 9 and 10. FIG. 10 shows a timing diagram of the steps performed in the overall operation of the end of string detector and the sign detector of the present invention. For purposes of example, and in no way intended to limit the present invention, assume that operand data is to be loaded into stack A 330 most significant bit (MSB) first starting at location 1, as shown in FIG. 9. The most significant bit is to be placed in character position 4, and further, for purposes of example here, assume that the number of characters to be loaded is 36. In this case, the sign character will be in word location 3 and character position 7 (of the even half of stack A 330) as shown in FIG. 9. In this example the value of P received from CUPS will be 4 (0100 binary) and the value of L-1 received from CUPS will be 35 (00100011 binary). These values are coupled to ADDER1 506, yielding a sum of 39 (00100111 binary). The first four bits of the APR signal, i.e., 0010, is transmitted to constant register 507, which is in turn coupled to ADDER2 403. The first write address location (the write address pointer) has a value of 1, 0001 binary. The write address pointer is coupled to the A input of COMP1 401 and is also coupled to the starting address register 504 and saved for subsequent use. The starting address value stored in the starting address register 504 is coupled to read address register 502, which in turn is coupled to the B input of COMP1 401. Since the write address pointer is equal to the starting address pointer no output results from COMP1 401, resulting in a zero input to the high order A input of COMP2 402. The low order A input of COMP2 402 is the write address pointer (0001 binary). The starting address pointer coupled from read address register 502 to ADDER2 403 has a value of 1 (0001 binary). The resulting sum of ADDER2 is the sign pointer value of 0011 binary which is coupled to the low order B inputs of COMP2 402. Since the result of the addition does not include a carry a zero bit is coupled to the high order B input of COMP2 402. Since the B signal is greater than the A signal at this time no SGNVLD output signal is generated from COMP2 402. This sequence occurs during cycle 6 as shown in FIG. 10. During cycle 7 the second double word is written into location 2 of stack A 330, the write address pointer having a value of 2, i.e., 0010 binary, and the A input to COMP2 402 being 00010 binary. Again, no SGNVLD signal is generated. During cycle 8 a third double word is read into stack A 330 and during this cycle the write address pointer has a value of 3, the A input of COMP2 402 during cycle 8 having a value of 00011 binary. During cycle 8 the A input and B input of COMP2 402 are equal, hence, no SGNVLD signal is generated. During cycle 9, as shown in FIG. 10, the write address pointer has a value of 4. In this case since the A input to COMP2 402 is greater than the B input, the SGNVLD signal is generated. During cycle 9, as shown in FIG. 10, the output of ADDER2 403 (the ADCA-RA signal having a value of 3) is coupled to the read address register 502 via the starting address switch 505. During cycle 10 the word location stored in read address register 502 is read from stack A 330 (in this case the value of 3 having been stored in read address register 502 will result in reading word 3) and the upper bits of the APR signal (Bits 4–7) which were 0111 binary at the start of the operation i.e., the resulting sum from ADDER1 506, are utilized to extract the correct character in character selector 404, namely the high order bit, i.e., 0, referring to the even half of memory and the 3 lower order bits, namely 111 binary, being character 7. This character is transferred to RSGN 405 and then to ROM decoder 406 where it is compared to a preselected character. The preselected character can be preloaded or loaded dynamically during the operation of the DECCU 211, and the verified character is then coupled to the register REG 408 for subsequent use. The SGNVLD signal which is latched up by a flip flop 407 during cycle 10 (signal FLDTS) is coupled to REG 408 to enable the storing of the verified character. The verified character of the operand data string being stored in register REG 408 for subsequent use during the execution of the instruction. Also during cycle 10, the read address register 502 is loaded with the start address value which has been stored in starting address register 504 for beginning the read out of the operands for the execution of the instruction.

Cycles 1 through 5 are utilized by the central unit 200 to fetch and decode the instruction as explained in detail in related application, noted in paragraph (4) above. The control signals FLVL2-BSY indicates the second stage of the DECCU 211 is busy, FLDTS initiates the loading of the trailing sign character into the RSGN register 408, and FANLD1 indicates the start of the execution of the instruction (shown here as loading location 1 of stack 330 into an alignment register).

Although the preferred embodiment of the present invention is directed to stack A 330, it is to be appreciated by those skilled in the art that the character detector of the present invention can be utilized for stack B 331 and stack C 332 of the DECCU 211, or for other storage devices.

Figure 11:
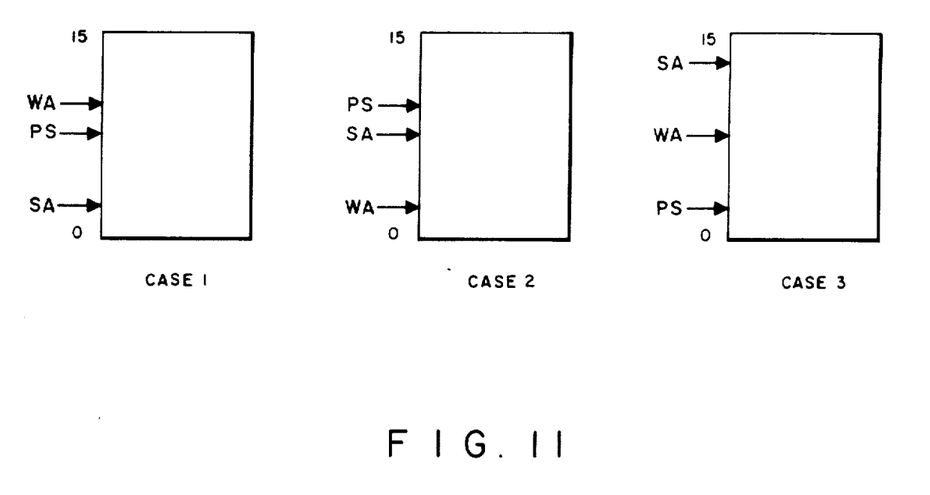
FIG. 11 depicts the valid combinations of pointer values of the present invention.

Although the example shows only one valid case of relative pointer values, it will be appreciated by those skilled in the art that, because of the wrap-around nature of the stack A 330, other valid cases can exist. In the preferred embodiment of the present invention two other valid cases exist of relative pointer values and which will result in a SGNVLD true condition (i.e., a resultant output of COMP2 402). The three valid combinations of pointer values of a stack are depicted in FIG. 11, case 1 having been discussed above. From the foregoing discussion it will be apparent that the preferred embodiment of the present invention can generate the SGNVLD signal for all three cases. The SGNVLD signal can be expressed by the following boolean equation:

$$SGNVLD = WA > PS > .SA + PS > .SA > WA + SA > - WA > PS.$$

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. An apparatus for detecting a predetermined character of a data string being loaded into a temporary storage memory comprising:
   (a) first comparator means for comparing a first pointer signal to a second pointer signal, to generate a first output signal when the value of said first pointer signal is less than the value of said second pointer signal;
   (b) means for adding said second pointer signal to a first signal having a value corresponding to the number of locations of said temporary storage memory to be loaded, to generate a third pointer signal, and to generate a second output signal when the value of said second pointer signal is greater than the value of said third pointer signal; and
   (c) second comparator means for comparing a first input signal, wherein said first input signal comprises said first output signal concatenated with said first pointer signal, to a second input signal, wherein said second input signal comprises said second output signal concatenated with said third pointer signal, to generate a third output signal indicating the end of the data string when said first input signal is greater than said second input signal.

2. An apparatus for detecting a predetermined character, according to claim 1, further comprising:
   (a) third comparator means, operatively connected to said temporary storage memory, for comparing the predetermined character of said data string to a preselected character, said predetermined character of said data string being transferred to said third comparator means from said temporary storage memory when said third output signal is generated, the location and character position of said predetermined character determined by said third pointer signal, said third comparator means generating a compare output signal indicating the predetermined character and preselected character are equal.

3. An apparatus for detecting a predetermined character, according to claim 2, further comprising:
   register means, operatively connected to said temporary storage memory, for temporarily holding said predetermined character when said compare output signal is generated.

4. A method of detecting a predetermined character of a data string being loaded into a temporary storage memory, comprising the steps of:
   (a) comparing a first pointer signal to a second pointer signal, to generate a first output signal when the value of said first pointer signal is less than the value of said second pointer signal;
   (b) adding said second pointer signal to a first signal having a value corresponding to the number of locations of said temporary storage memory to be loaded, to generate a third pointer signal, and to generate a second output signal when the value of said second pointer signal is greater than the value of said third pointer signal; and
   (c) comparing a first input signal, wherein said first input signal comprises said first output signal concatenated with said first pointer signal, to a second input signal, wherein said second input signal comprises said second output signal concatenated with said third pointer signal, to generate a third output signal indicating the end of the data string when said first input signal is greater than said second input signal.

5. A method of detecting a predetermined character of a data string being loaded into a temporary storage memory, comprising the steps of:
   (a) comparing a first pointer signal to a second pointer signal;
   (b) generating a first output signal when the value of said first pointer signal is less than the value of said second pointer signal;
   (c) adding said second pointer signal to a first signal having a value corresponding to the number of locations of said temporary storage memory to be loaded;
   (d) generating a third pointer signal, and a second output signal when the value of said second pointer signal is greater than the value of said third pointer signal;
   (e) comparing a first input signal, wherein said first input signal comprises said first output signal concatenated with said first pointer signal, to a second input signal, wherein said second input signal comprises said second output signal concatenated with said third pointer signal; and
   (f) generating a third output signal indicating the end of the data string when said first input signal is greater than said second input signal.

* * * * *